US011045731B1

(12) United States Patent
Reznik et al.

(10) Patent No.: US 11,045,731 B1
(45) Date of Patent: Jun. 29, 2021

(54) SYSTEMS AND METHODS FOR COMBINING A COMPUTER STORY GAME WITH A COMPUTER NON-STORY GAME

(71) Applicant: Playtika Ltd., Hertsliya (IL)

(72) Inventors: Zeev Reznik, Hod Hasharon (IL); Shoval Nachum, Modi'in (IL); Tristan Esaid, Spring Farm (AU); John Tsartsaflis, Punchbowl (AU); Amit Stoler, Tel-Aviv (IL); Daniella Strumpfman, Tel-Aviv (IL); Gennadi Khalin, Zetland (AU)

(73) Assignee: Playtika Ltd., Hertsliya (IL)

(*) Notice: Subject to any disclaimer, the term of this patent is extended or adjusted under 35 U.S.C. 154(b) by 0 days.

(21) Appl. No.: 17/066,061

(22) Filed: Oct. 8, 2020

(51) Int. Cl.
*A63F 13/47* (2014.01)

(52) U.S. Cl.
CPC .................... *A63F 13/47* (2014.09)

(58) Field of Classification Search
CPC ....................................................... A63F 13/47
See application file for complete search history.

(56) References Cited

U.S. PATENT DOCUMENTS

| | | | | |
|---|---|---|---|---|
| 6,106,399 A * | 8/2000 | Baker | ........... | A63F 13/12 463/42 |
| 6,716,103 B1 * | 4/2004 | Eck | ........... | A63F 13/02 463/45 |
| 7,275,994 B2 * | 10/2007 | Eck | ........... | A63F 13/02 463/45 |
| 8,469,817 B2 * | 6/2013 | Eck | ........... | A63F 13/02 463/42 |
| 8,961,320 B2 * | 2/2015 | Eck | ........... | A63F 13/02 463/42 |
| 9,436,276 B2 * | 9/2016 | Ofek | ........... | A63F 13/79 |
| 9,457,266 B2 * | 10/2016 | Eck | ........... | A63F 13/02 |
| 9,563,202 B1 * | 2/2017 | Bear | ........... | H04N 21/4223 |
| 9,579,586 B2 * | 2/2017 | Bear | ........... | G06T 19/003 |
| 9,612,627 B2 * | 4/2017 | Bear | ........... | H04N 21/8106 |

(Continued)

OTHER PUBLICATIONS

Play Slotomania, The #1 Free Slot Machine Game! https://www.slotomania.com, Printed on Oct. 7, 2020.

(Continued)

*Primary Examiner* — Omkar A Deodhar
*Assistant Examiner* — Matthew D Hoel
(74) *Attorney, Agent, or Firm* — Pearl Cohen Zedek Latzer Baratz LLP

(57) ABSTRACT

A system and method for providing a combined computer game including providing a computer non-story game and a computer story game, wherein the computer story game is represented as a directed graph wherein nodes of the directed graph represent pages, and edges of the directed graph represent choices, wherein progressing in the computer story game includes: presenting a subset of choices originating from a single page to a user, wherein at least one choice of the subset of choices is associated with a challenge achievable at the computer non-story game; receiving a selection of a choice from the user; progressing to a next page according to the selection of the user, wherein selecting the at least one choice associated with challenge includes stalling the computer story game until the user completes the challenge at the computer non-story game; and presenting the selected page to the user.

20 Claims, 7 Drawing Sheets

(56) References Cited

U.S. PATENT DOCUMENTS

| | | | |
|---|---|---|---|
| 9,656,168 B1* | 5/2017 | Bear | H04N 21/47 |
| 9,658,617 B1* | 5/2017 | Bear | H04N 21/41407 |
| 9,662,565 B1* | 5/2017 | Riordan | A63F 13/40 |
| 9,782,684 B2* | 10/2017 | Bear | H04N 5/445 |
| 9,791,897 B2* | 10/2017 | Bear | G06F 1/1694 |
| 9,919,233 B2* | 3/2018 | Bear | H04N 21/42224 |
| 10,043,412 B2* | 8/2018 | Lore | A63F 13/69 |
| 10,220,307 B2* | 3/2019 | Eck | A63F 13/08 |
| 10,235,896 B2* | 3/2019 | Stewart | G09B 7/04 |
| 10,279,257 B2* | 5/2019 | Sack | H04N 21/8541 |
| 10,293,247 B2* | 5/2019 | Heatherly | A63F 13/40 |
| 10,549,185 B2* | 2/2020 | Roudy | A63F 1/00 |
| 10,596,478 B2* | 3/2020 | Bear | G06T 15/10 |
| 10,845,963 B2* | 11/2020 | Chapman | G06F 8/20 |
| 10,850,197 B1* | 12/2020 | Hellam | A63F 13/48 |
| 2004/0176170 A1* | 9/2004 | Eck | A63F 13/08 463/43 |
| 2006/0040748 A1* | 2/2006 | Barthold | A63F 13/02 463/43 |
| 2008/0119274 A1* | 5/2008 | Eck | A63F 13/08 463/40 |
| 2010/0218094 A1* | 8/2010 | Ofek | A63F 13/79 715/706 |
| 2010/0317443 A1* | 12/2010 | Cook | A63F 13/12 463/42 |
| 2011/0070936 A1* | 3/2011 | Barthold | A63F 13/02 463/1 |
| 2012/0007817 A1* | 1/2012 | Heatherly | A63F 13/2145 345/173 |
| 2013/0083008 A1* | 4/2013 | Geisner | A63F 13/5255 345/419 |
| 2013/0281205 A1* | 10/2013 | Eck | A63F 13/12 463/31 |
| 2014/0002580 A1* | 1/2014 | Bear | A63F 13/213 348/14.07 |
| 2014/0002581 A1* | 1/2014 | Bear | G05D 1/0038 348/14.07 |
| 2014/0002582 A1* | 1/2014 | Bear | H04N 13/204 348/14.08 |
| 2014/0019865 A1* | 1/2014 | Shah | H04N 21/8545 715/731 |
| 2014/0115464 A1* | 4/2014 | Shih | G06Q 10/109 715/716 |
| 2014/0128166 A1* | 5/2014 | Tam | A63F 13/61 463/42 |
| 2014/0228116 A1* | 8/2014 | Eck | A63F 13/23 463/31 |
| 2014/0248957 A1* | 9/2014 | Eck | A63F 13/02 463/34 |
| 2014/0349258 A1* | 11/2014 | Lore | G09B 19/0061 434/130 |
| 2016/0342432 A1* | 11/2016 | Ofek | G06F 9/453 |
| 2017/0028308 A1* | 2/2017 | Bear | A63F 13/803 |
| 2017/0031357 A1* | 2/2017 | Bear | A63F 13/211 |
| 2017/0031391 A1* | 2/2017 | Bear | A63H 30/04 |
| 2017/0032570 A1* | 2/2017 | Bear | A63F 13/45 |
| 2017/0098381 A1* | 4/2017 | Stewart | A63F 3/0421 |
| 2017/0144069 A1* | 5/2017 | Bear | G06F 3/012 |
| 2017/0144079 A1* | 5/2017 | Bear | G06F 3/012 |
| 2017/0146997 A1* | 5/2017 | Bear | A63H 30/04 |
| 2017/0173466 A1* | 6/2017 | Fahmie | A63F 13/30 |
| 2017/0182406 A1* | 6/2017 | Castiglia | G06K 9/00335 |
| 2018/0028901 A1* | 2/2018 | Roudy | A63F 3/0434 |
| 2018/0028931 A1* | 2/2018 | Bear | G05D 1/0016 |
| 2018/0074668 A1* | 3/2018 | Chapman | G06F 8/20 |
| 2018/0185763 A1* | 7/2018 | Bear | A63F 13/428 |
| 2019/0118090 A1* | 4/2019 | Benedetto | A63F 13/95 |
| 2020/0129853 A1* | 4/2020 | Roudy | A63F 1/00 |
| 2020/0135049 A1* | 4/2020 | Atencio | G09B 19/0053 |
| 2020/0174563 A1* | 6/2020 | Peters | G06F 3/013 |
| 2020/0197825 A1* | 6/2020 | Bear | H04N 7/157 |
| 2020/0265451 A1* | 8/2020 | McKinlay | A63F 13/25 |
| 2020/0360808 A1* | 11/2020 | Hellam | A63F 13/80 |
| 2020/0405213 A1* | 12/2020 | Chappell, III | A61B 5/389 |
| 2021/0090463 A1* | 3/2021 | Atencio | G06N 20/00 |

OTHER PUBLICATIONS

Fictions: Choose your emotions, https://play.google.com/store/apps/details?id=com.tictales.fictions, Printed on Oct. 7, 2020.

Decisions: Choose Your Interactive Stories Choice, https://play.google.com/store/apps/details?id=com.games2win.decsions, Printed on Oct. 7, 2020.

About Episode, https://home.episodeinteractive.com/about, Printed on Oct. 7, 2020.

Choices—Stories you play, Games—Pixelberry Studios, https://www.pixelberrystudios.com/games, Printed on Oct. 7, 2020.

Moments: Choose Your Story—Apps on Google Play, https://play.google.com/store/apps/details?id=com.gg.lovestory.moments, Printed on Oct. 7, 2020.

Stories: Your Choice, https://play.google.com/store/apps/details?id=com.teslagames.stories, Printed on Oct. 7, 2020.

Story Beats: Operate Now Stories, https://play.google.com/store/apps/details?id=com.spllgames.story.beats, Printed on Oct. 7, 2020.

\* cited by examiner

SYSTEMS AND METHODS FOR COMBINING A COMPUTER STORY GAME WITH A COMPUTER NON-STORY GAME

FIELD OF THE INVENTION

The present invention relates generally to a computer game produced and displayed by a computer system, and specifically to providing a combination of a computer story game with a computer non-story game.

BACKGROUND

Interactive story computer games may provide a storytelling computerized platform in which choices of the user may affect the plot or storyline of the story generated by the interactive story computer game. Thus, the path of the story may be personalized according to the user preferences. Providing personalized storylines may increase the interest of the player in the game and thus increase player retention.

SUMMARY

According to embodiments of the invention, a system and method for providing a combined computer game may include: providing, by a processor, a computer non-story game; and providing, by the processor, a computer story game, wherein the computer story game may be represented as a directed graph wherein nodes of the directed graph represent pages, and edges of the directed graph represent choices, wherein progressing in the computer story game may include: presenting, by the processor on a computer output device, a subset of choices originating from a single page to a user, wherein at least one choice of the subset of choices may be associated with a challenge achievable at the computer non-story game; receiving, at the processor, a selection of a choice of the subset of choices from the user; progressing to a next page, by the processor, according to the selection of the user, wherein selection of the at least one choice associated with challenge may include stalling the computer story game, by the processor, until the user completes the challenge at the computer non-story game; and presenting, on a computer output device, the selected page to the user.

According to embodiments of the invention, the non-story game may include winnable game assets that are provided to a player based on the player achievements in the non-story game, wherein the challenge may specify an amount of the winnable game assets, wherein completing the challenge may include providing from the user to the processor the specified amount of the winnable game assets.

According to embodiments of the invention, at least one choice of the subset of choices may be associated with providing a reward to the user.

According to embodiments of the invention, playing the computer non-story game may require receiving game assets by the processor from the user, wherein the reward may include an amount of the game assets.

According to embodiments of the invention, at least one choice of the subset of choices may be associated with a mini-game, wherein selecting, by the user, the choice associated with the mini-game may include providing, by the processor a mini-game to the user.

According to embodiments of the invention, wherein the computer non-story game may be selected from slot games, bingo game, card game, lottery game, casual games, puzzle games, board games, adventure games, action games and match three games.

According to embodiments of the invention, the association of the challenge and the at least one choice may change between repetitions of the computer story game.

Embodiments of the invention may include presenting the challenge to the user after obtaining the selection of the at least one choice associated with challenge.

According to embodiments of the invention, a system and method for providing a combined computer game may include: providing, by a processor, a computer non-story game, wherein the non-story game may include a first type of winnable game assets that are provided to a player based on the player achievements in the non-story game; and providing, by the processor, a computer story game, wherein the computer story game may include a story with a plurality of consecutive segments, each segment comprising a nodes and a plurality of branches originating from the node and leading to other nodes, wherein each node may be associated with a unique narrative, wherein progressing in the computer story game may include: presenting, by the processor, a subset of branches originating from a single node to the player, wherein at least one branch of the subset of branches may be associated with an amount of the first type of winnable game assets; receiving, at the processor, selection of a branch of the subset of branches from the player; progressing, by the processor, to the branch selected by the player, wherein progressing to the branch associated with the amount of the first type of winnable game assets may include receiving, by the processor, the amount of the first type of winnable game assets from the player; and presenting, on a display, the narrative of the node associated with the selected branch to the player.

According to embodiments of the invention, playing the computer non-story game may require receiving, by the processor from the player, a second type of winnable game assets, wherein selecting the at least one branch of the subset of branches that is associated with an amount of the winnable game assets may provide an amount of the second type of winnable game assets to the player.

According to embodiments of the invention, at least one branch of the subset of branches may be associated with a mini-game reward, wherein selecting, by the processor, the branch associated with the mini-game reward may include providing, by the processor a mini-game to the player.

According to embodiments of the invention, the mini-game may include the first type of winnable game assets that are provided to a player based on the player achievements in the mini-game.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
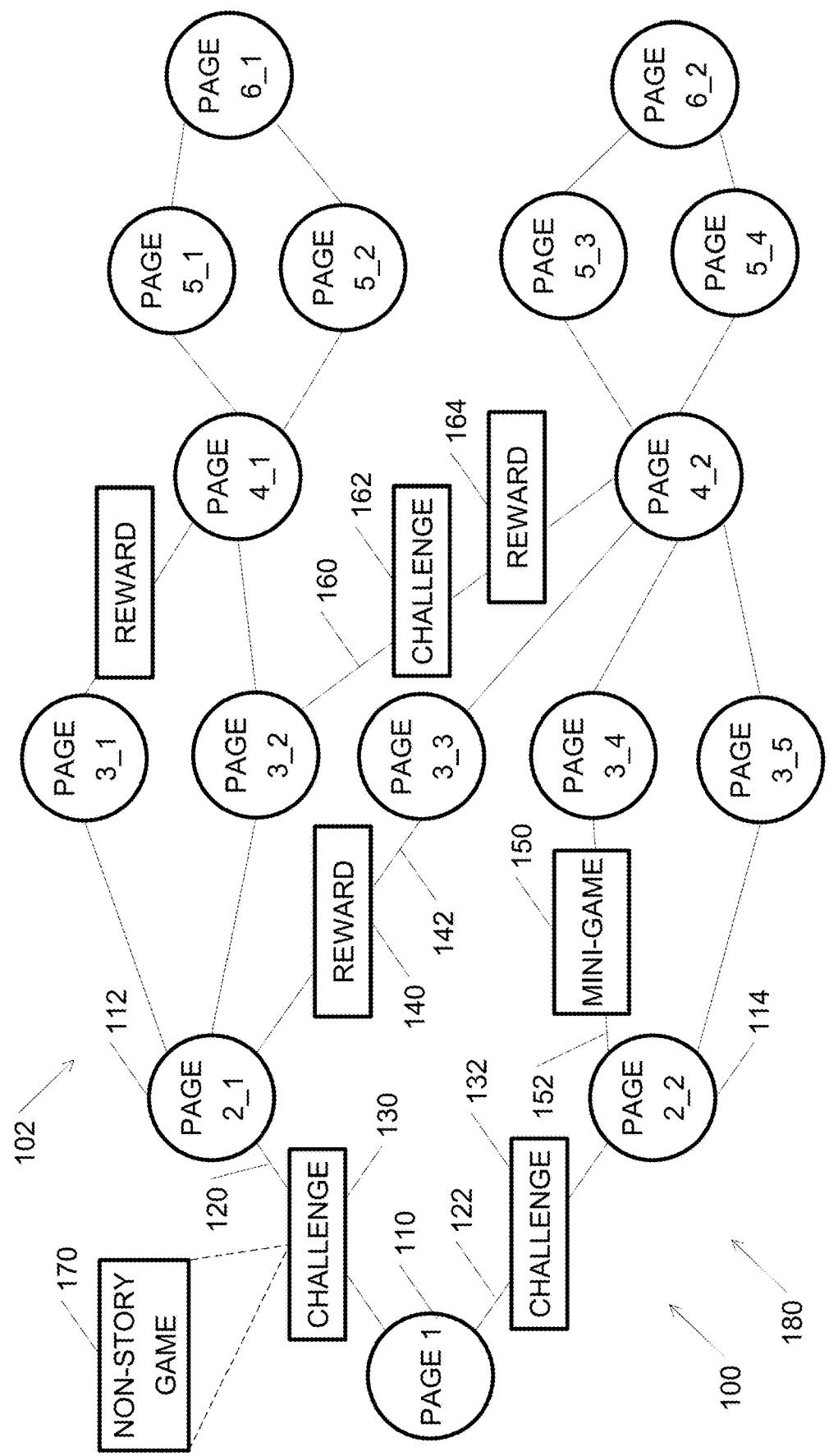
FIG. 1 depicts a combined computer game including a computer story game and a computer non-story game, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

According to embodiments of the invention, a combined computer game, including a computer story game and a computer non-story game may be provided to the user. The computer story game and the computer non-story game may be interrelated as disclosed herein. Adding a story game to a non-story game may engage players to the combined computer game, as a result of the natural curiosity of players. Thus, the combination of a non-story game and a story game may increase the interest of players in the computer game and thus increase player retention. Embodiments of the invention may improve the technology of computer games by providing interrelations between the story and non-story computer games that would add challenge and interest to the combined computer game.

Reference is now made to FIG. 1, which depicts a combined computer game 100 including a computer story game 180 and a computer non-story game 170, according to embodiments of the invention. According to embodiments of the invention, the computer story game 180 may be represented as a directed graph 102 wherein vertices, nodes, pages or 110, 112, 114, of the directed graph 102 each include a part or scene of the story, and edges, choices or branches 120, 122, 160 of the directed graph 102 are alternative routes for continuing the story. In the example presented in FIG. 1, circles present nodes or vertices 110, 112, 114, and lines represent edges 120, 122, 160. Thus, pages (e.g., represented by nodes 110, 112, 114) are connected by choices (e.g., represented by edges 120, 122, 160) that lead from one page to another according to a choice made by the player also referred herein as the user.

Each page (e.g., nodes 110, 112, 114) may include a part, a portion, a chapter, a scene, a narrative or an episode of a story, and each choice (edges 120, 122, 160) may represent a link to subsequent page or node, thus each choice may lead to different or alternative nodes or pages. Thus, each node corresponds to an output from a computer to a game player. A node or page 110, 112, 114 may include a decision point in which one or more choices or edges 120, 122, 160 are presented to the player. For example, on page 1 (node 110) two choices are presented to the player, e.g., represented by or corresponding to edges 120 and 122. If the user chooses the option corresponding to edge 120, the story, and the computer story game, may continue or progress to page 2_1 (node 112, provided that the player accomplishes challenge 130 associated with choice 120), and the computer game may provide output corresponding to node 112. If, however, the user chooses the option corresponding to edge 122, the story, and the computer story game, may continue or progress to page 2_2 (node 114, provided that the player accomplishes challenge 132 associated with choice 122). Since each of pages 2_1 and 2_2 may include different episodes, the choice made by the player may influence the storyline of computer story game 180. Thus, computer story game 180 may progress along a path of nodes 110 and edges 112 according to selections or choices made by the player. For example, a first path of in computer story game 180 may include page 1, page 2_1, page 3_2, page 4_2, page 5_3 and page 6_2. A second path computer story game 180 may include page 1, page 2_2, page 3_4, page 4_2, page 5_4 and page 6_2. Thus, a player progressing along the first path would obtain a different story from computer story game 180 than a player progressing along the second path.

According to embodiments of the invention, pages may be presented to the player on a computer output device (e.g., output device 740 such as a display and/or speakers), in any applicable manner or format, e.g., as text, images, comix, dialog boxes, amination, audio, video etc. Similarly, the choices may be presented to the user on a computer output device (e.g., output device 740 such as a display and/or speakers). The user may provide a selection of a choice or branch for example, by clicking on a choice using a computer input device (e.g., input device 735 such as a keyboard, touchscreen, microphone, etc.).

According to some embodiments, a computer non-story game 170 may be provided to the player. In some embodiments, the computer story game 180 and the computer non-story game 170 may be presented in a single window or at different windows on the computer display, at the same time or at interleaved time slots, e.g., the player may move from the computer story game 180 to the computer non-story game 170 and back. In some embodiments, computer non-story game 170 may include winnable game assets that may be provided to the player based on the user achievements in computer non-story game 170. For example, if the player completes a mission or achieves a goal in computer non-story game 170, the user may win an amount of the winnable game assets. According to some embodiments, computer non-story game 170 may be or may include a game where progressing along a storyline is not the primary purpose of the game. Examples for computer non-story games 170 may include slot games, bingo game, card game, lottery game, casual games, puzzle games, board games, adventure games, action games, match three games, etc.

According to some embodiments, a computer non-story game 170 may be combined with computer story game 180 by associating at least one choice, option or edge of the computer story game 180 with a challenge 130 achievable at the computer non-story game 170. Thus, if the player wants to select an option associated with edge 120 that is associated with challenge 130, the player has to accomplish challenge 130 in computer non-story game 170. In some embodiments, challenge 130 may include or specify a predetermined amount of the game assets winnable in computer non-story game 170. The type and complexity of the challenge may vary according to the type of computer non-story game 170, the stage or progression of the player in the computer story game 180 and other parameters. For example, challenge 162 associated with edge 160 may be harder to achieve than challenge 130 associated with edge 120. In some embodiments, if the player selects edge 120, computer story game 180 may stall, halt or temporarily stop until the user completes challenge 130 (e.g. the user cannot advance the game until completing the challenge). Once challenge 130 is completed, computer story game 180 may move or progress to page 2_1 (node 112). For example, if the player selects edge 120, the computer story game 180 may progress to node 112 once an amount of winnable game assets specified in challenge 130 is obtained from the player.

According to some embodiments, at least one choice or edge 142 in the computer story game 180 may be associated with providing a prize or reward 140 to the player or user. Reward 140 may include in-game or out-of-game valuables. For example, an in-game reward may include an amount of game assets (e.g., game coins) usable for playing in computer non-story game 170 (game assets usable for playing in computer story game 180 may also be provided). An out-of-game reward may include money, discounts or coupons and other promotions. Other types of rewards 140 may be provided. The type and amount of the rewards 140 may vary randomly or according to the type of computer non-story game 170, the stage or progression of the player in the computer story game 180 and other parameters. For example, reward 140 associated with edge 142 may be smaller than reward 164 associated with edge 160. According to some embodiments, a single edge or choice 160 may be associated with a challenge 162 and a reward 164. Thus, if the player chooses the choice associated with edge 160, he is provided a challenge 162, and if the player achieves challenge 162, the player obtains reward 164 and computer story game 180 may progress to page 4_2.

According to some embodiments, at least one choice or edge 152 in the computer story game 180 may be associated with a mini-game 150. Thus, if the player selects edge 152 mini-game 150 may be provided to the player. Mini-game 150 may include any type of computer game, typically a short computer game such as fit four, puzzle game, a card game, etc., and may be a type of a reward 140 (provided as a prize to the player) and/or a challenge 130 (provides a challenge that the user has to achieve).

According to some embodiments, each choice or edge 120, 122 originating from a single page (node 110) may be associated with a challenge 130, 132. For example, choice 120 originating from page 1 may be associated with challenge 122 and choice 122 originating from page 1 may be associated with challenge 132. The type and difficulty of challenges 130 and 132 associated with edges 120 and 122, respectively, may be different. The same holds true for rewards 140, e.g., each choice or edge originating from a single page may be associated with a (different) reward.

According to some embodiments, some or all of challenges 130, rewards 140 and mini-games 150 associated with a choice or edge 120, 142, 152 may be presented to the user before making the selection. For example, challenge 130 may be presented to the user as associated with choice 120 together with choices 120 and 122, and/or reward 140 may be presented to the user as associated with choice 142 together with the other choices branching from page 2_1 (node 112). Thus, the player may know what type of challenge, reward and/or mini-game is associated with each choice that the player makes before selecting a choice. In some embodiments, some or all of the challenges 130, rewards 140 and mini-games 150 associated with a choice or edge 120, 142, 152 may not presented to the user before making the selection, and may be revealed or presented to the player after making the selection of a choice or edge 120, 142, 152, e.g., as a surprise.

In some embodiments, the arrangement, distribution or association of challenges 130, rewards 140 and mini-games 150 with choices or edges 120, 142, 152 may be constant, e.g., repeat and remain the same between repetitions of computer story game 180. Thus, a player playing computer story game 180 for at least the second time may know, at least for the choices the player has previously selected, that a certain choice 120, 142, 152 is associated with a certain challenge 130, reward 140 or min-game 150, e.g., that choice 120 is associated with challenge 130. In some embodiments, the arrangement, distribution or association of challenges 130, rewards 140 and mini-games 150 with choices or edges 120, 142, 152 may change between repetitions of computer story game 180. For example, the association of challenges 130, rewards 140 and mini-games 150 and choices 120, 142, 152 may be performed, e.g., by a processor, in substantially each repetition of computer story game 180, e.g., whenever generating and presenting computer story game 180 to the player. Thus, the player may be surprised by the association of challenges 130, rewards 140 or min-games 150 with choices or edges 120, 142, 152, even after playing computer story game 180 many times.

Figure 2:
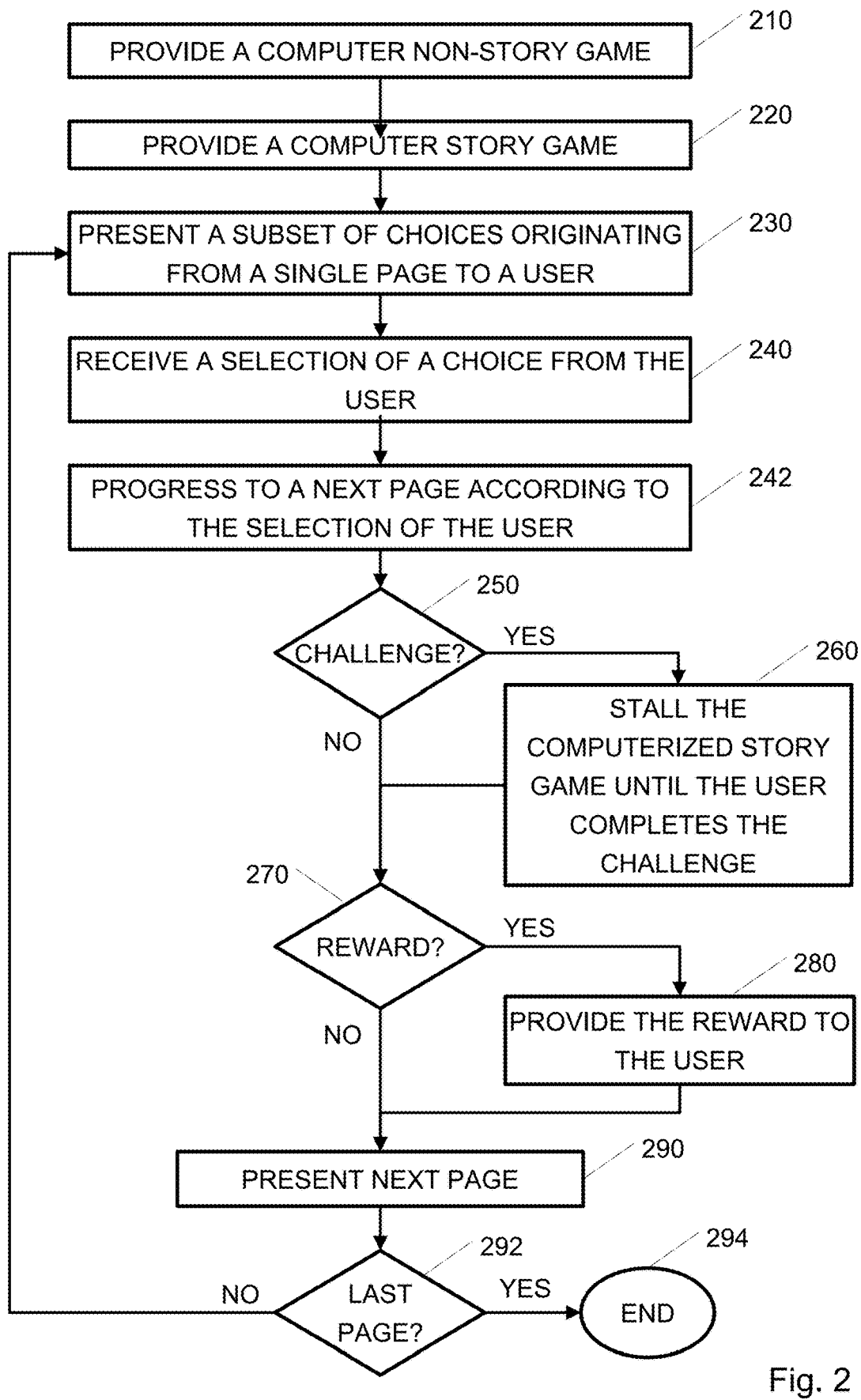
FIG. 2 is a flowchart of a method for providing a combined computer game, according to embodiments of the invention.

Reference is made to FIG. 2, which is a flowchart of a method for providing a combined computer game, according to embodiments of the invention. An embodiment of a method providing a combined computer game may be performed, for example, by the systems shown in FIGS. 3 and 4, but other hardware may be used.

In operation 210, a computer non-story game may be offered, provided, or displayed to a user; e.g. a processor of a game server (e.g. game server 410) may execute code to generate a computer non-story game (e.g., computer non-story game 170) which may be displayed or otherwise provided on a player device (e.g. device 110), and a user (a player) may provide input to the player device which may cause the player device or the game server to play the computer non-story game. The computer non-story game may include a first type of game assets usable by the player to achieve game goals according to game rules, and a same or second type of game assets winnable by the player according to game rules. For example, the computer non-story game may be a slot game and the first type of game assets may include in-game currency required to play the slot game.

In operation 220, a computer story game may be offered or provided, or displayed, to a user; e.g. a processor of a game server (e.g. game server 410) may execute code to generate a computer story game (e.g., computer story game 180) which may be displayed or otherwise provided on a player device (e.g. device 110), and a user (a player) may provide input to the player device which may cause the player device or the game server to play the computer story game.

The computer story game may include a story made of or represented by a plurality of consecutive segments, and each segment may include a node or vertex including or associated with a unique (e.g. unique within the story) narrative or part of the story, and at least one choice or branch originating from the node or its representative page, where each branch may lead to another node until a final node is reached. The computer story game may be represented as a directed graph wherein nodes of the directed graph are, or represent pages, and edges of the directed graph are, or represent choices.

In operation 230, a processor may present a subset of choices originating from a single page node or vertex to a user on an output device of a computer, e.g., a display. A page may present a portion of a story and a choice may be related to that portion by providing a link to a subsequent portion of the story. According to some embodiments, at least one choice of the subset of choices may be associated with a challenge achievable at the computer non-story game, or with an amount of game assets winnable at the computer non-story game, e.g., an amount of the second type of game assets of the computer non-story game. For example, the processor may present choices of edges 120 and 122 originating from node 110, where choice 120 is associated with a challenge 130. It is noted that not necessarily all subset of choices of the computer story game include a challenge, but at least one of the subset of choices of the computer story game includes a challenge. According to some embodiments, at least one choice of the subset of choices may be associated with a reward or with a mini-game. According to some embodiments, the reward may include game assets usable for playing in the non-story computer game.

In operation 240, a selection of a choice of the subset of choices may be obtained at the processor from the user. For example, if the subset of choices includes choices of edges 120 and 122, the user may select choice 120 or choice 122. In operation 242, the processor may progress or move to the next page, node or vertex according to the selection obtained from the user.

If, as indicated in block 250, the selected choice, edge or branch is associated with a challenge, then in operation 260 the user has to complete the challenge associated with the selected branch. In some embodiments completing the challenge may include completing or performing tasks in the computer non-story game. In some embodiments, the challenge includes or specifies an amount of the winnable game assets that are required to complete the challenge and completing the challenge may include obtaining by the processor (or software operating the computer story game) from the user the specified amount of game assets winnable at the computer non-story game, e.g., the second type of game assets. In some embodiments, the processor may stall, halt or temporarily stop the computer story game (e.g. preventing progress to a next page or choices) until the user completes the challenge. For example, if the challenge associated with the selected branch includes obtaining an amount of game assets winnable at the computer non-story game, then if the user has this amount of game assets the user may provide or transfer the amount of game assets in order to progress to the next node. If, however, the user does not have the required amount of game assets, the processor may stall the computer story game, the user may move to play at the non-story game, collect the needed amount of game assets and provide the collected amount of game assets at the computer story game.

If, as indicated in block 270, the selected choice, edge or branch is associated with a reward, then in operation 280, the processor may provide the reward to the user. For example, the reward may include an amount of the first type of game assets, e.g., game assets required for playing in the mom-story computer game. If he selected choice, edge or branch is associated with a mini-game, then the mini-game may be provided to the user.

In operation 290, the next page may be presented or provided to the user over an output device of the computer, e.g., a display. In operation 292, it may be determined whether the computer story game has reached the last page, e.g., page 6_1 or page 6_2 in computer story game 180. If a last page was reached, the computer story game ends or terminates, as indicated in block 294. Otherwise, the combined computer game may progress along the directed graph of the computer story game by repeating operations 230-292.

Figure 3:
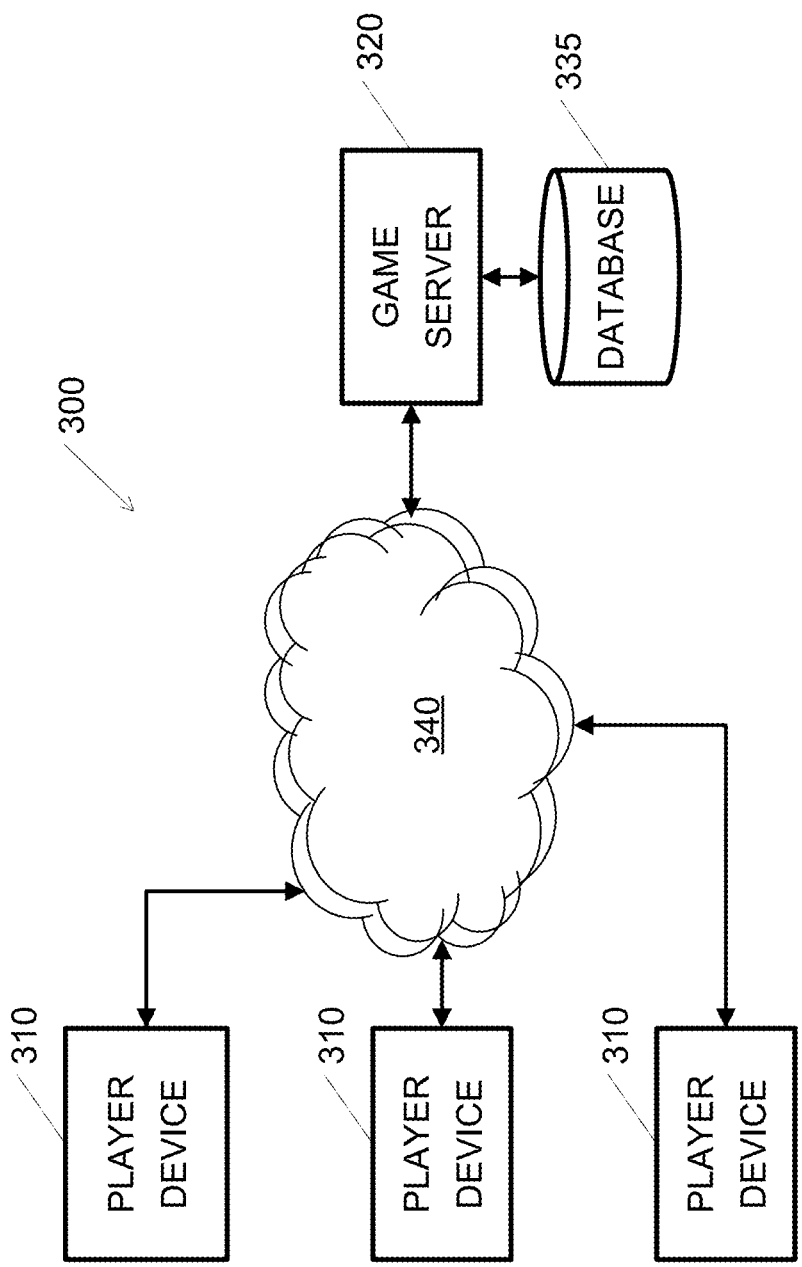
FIG. 3 illustrates a system according to embodiments of the invention.

Reference is made to FIG. 3, which schematically illustrates a system 300, according to embodiments of the invention. System 300 may include one or more player devices or user devices 310 connectable to a network 340, e.g., the internet, and one or more game servers 320, each connectable to network 340.

Figure 8:
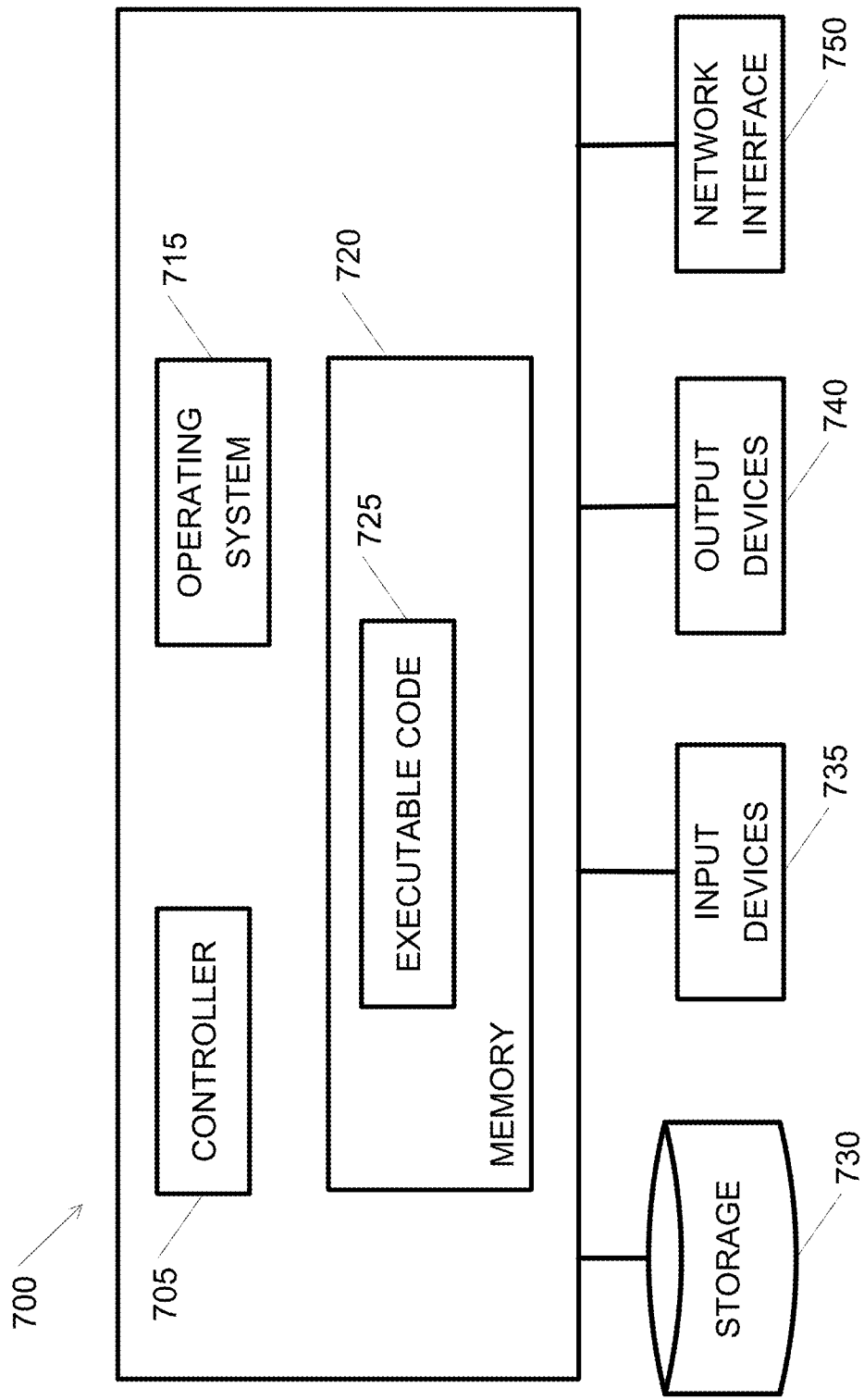
FIG. 8 illustrates an example computing device according to an embodiment of the invention.

Each of player devices 310 and game servers 320 may be or may include a computing device such as computing device 700 depicted in FIG. 8. One or more databases 335 may be or may include a storage device such as storage device 730. Database 335 may store parameters related to a computer game, including directed graphs 102 of computer story games, data related to computer non-story games, such as the first and second types of game assets, etc., according to embodiments of the invention. Player device 310 may be or may include any applicable type of gaming device including but not limited to a personal computer, a portable computer, a tablet, a smartphone, a gaming console, etc.

According to some embodiments, a game server 320 may host a combined computer game as disclosed herein. The combined computer game may be offered to any of player devices 310 over network 340. Other system architectures may be used, for example according to some embodiments, the computer game may be self-contained in player device 310.

Networks 340 may include any type of network or combination of networks available for supporting communication between player devices 310 and game servers 320. Networks 340 may include for example, wired and wireless telephone networks, the Internet and intranet networks, etc.

Figure 4:
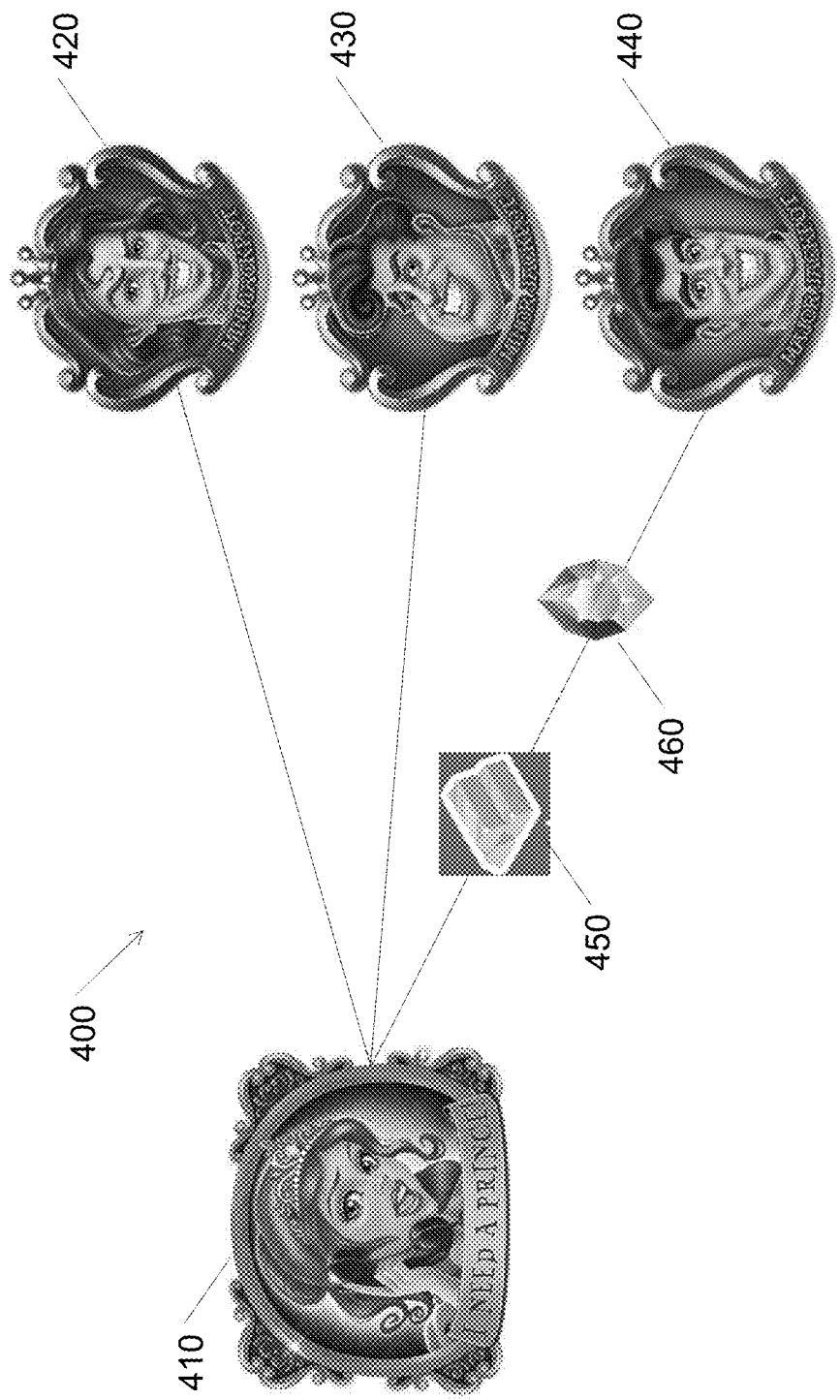
FIG. 4 illustrates an example a part of a directed graph of a computer story game of a combined computer game, according to an embodiment of the invention.

Reference is now made to FIG. 4 which illustrates an example a part of a directed graph 400 of a story of a combined computer story and non-story game, according to an embodiment of the invention. The part of the directed graph 400 depicted in FIG. 4 includes a node 410 that describes a princess wants to find a prince. Three edges or choices 420, 430 and 440 originating from node 410 may lead to three different nodes, each including a different prince. When playing the computer story game, edges or choices 420, 430 and 440, e.g., the three princes may be presented on a display of a computer, and the player may select a prince (e.g., one of edges or choices 420, 430 and 440), for example by clicking or touching the picture of the selected prince. Upon selecting, the computer story game may progress to the selected node that may include a different episode or page in the story. The display may also include gold bars 450, associated with a single choice 440. Gold bars 450 may represent or be associated with a challenge provided to user selecting choice 440. Thus, if the user selects choice 440, the computer story game may halt or temporarily stop until the user accomplish challenge represented by gold bars 450. The challenge represented by gold bars 450 may be achievable at the computer non-story game associated with the computer story game. The display may also include a diamond 460 associated with a single choice 440. Diamond 460 may represent or be associated with a reward collectable by the player when selecting edge or choice 440. The reward may include any in-game asset, e.g., an asset usable in the computer story game or an in-game asset usable in the non-story computer game, or an out-of-game reward as disclosed herein.

Figure 5:
FIG. 5 is an example screenshot of two possible choices in a story of a combined computer story and non-story game, according to an embodiment of the invention.
Figure 6:
FIG. 6 is an example screenshot of three possible choices in a story of a combined computer story and non-story game, according to an embodiment of the invention.
Figure 7:
FIG. 7 is an example screenshot of a non-story game of a combined computer story and non-story game, according to an embodiment of the invention.

Reference is now made to FIGS. 5-7 which depict screenshots of an example of a combined computer story and non-story game, according to an embodiment of the invention. FIG. 5 illustrates an example screenshot of two possible choices in the computer story game, FIG. 6 illustrates an example screenshot of three possible choices in the computer story game, and FIG. 7 illustrates an example screenshot of the computer non-story game of the combined computer story and non-story game, according to an embodiment of the invention. In FIG. 5 the player may select between two different styles of the princess and in FIG. 6 the player may select between three different types of music. In FIG. 7, the non-story computer game includes a slot computer game. For example, to play the slot game presented in FIG. 7 the player would have to use at least some game assets, e.g., game assets provided by diamond 460. The gold bars in FIG. 7 may represent winnable game assets that may be used to progress in the associated computer story game, e.g., to select and progress to edge or choice 440.

FIG. 8 illustrates an example computing device according to an embodiment of the invention. Various components such as user devices 310, game servers 320, and other modules, may be or include computing device 700, or may include components such as shown in FIG. 8. For example, a first computing device 700 with a first processor 705 may be used to provide a combined computer game including a story computer game and a computer non-story game as disclosed herein.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation, a server or a personal computer, a smartphone, a tablet, a portable computer, a gaming console, or any other computing device, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include an application to provide a combined computer game including a computer story game and a non-story computer game. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 8 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a WiFi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for providing a combined computer game, the method comprising:
   providing, by a processor, a computer non-story game; and
   providing, by the processor, a computer story game, wherein the computer story game is represented as a directed graph wherein nodes of the directed graph represent pages, and edges of the directed graph represent choices,
   wherein progressing in the computer story game comprises:
      presenting, by the processor on a computer output device, a subset of choices originating from a single page to a user, wherein at least one choice of the subset of choices is associated with a challenge achievable at the computer non-story game;
      receiving, at the processor, a selection of a choice of the subset of choices from the user;
      progressing to a next page, by the processor, according to the selection of the user, wherein selection of the at least one choice associated with challenge comprises stalling the computer story game, by the processor, until the user completes the challenge at the computer non-story game; and
      presenting, on a computer output device, the selected page to the user.

2. The method of claim 1, wherein the non-story game comprises winnable game assets that are provided to a player based on the player achievements in the non-story game, wherein the challenge specifies an amount of the winnable game assets, wherein completing the challenge comprises providing from the user to the processor the specified amount of the winnable game assets.

3. The method of claim 1, wherein at least one choice of the subset of choices is associated with providing a reward to the user.

4. The method of claim 1, wherein playing the computer non-story game requires receiving game assets by the processor from the user, wherein the reward comprises an amount of the game assets.

5. The method of claim 1, wherein at least one choice of the subset of choices is associated with a mini-game, wherein selecting, by the user, the choice associated with the mini-game comprises providing, by the processor a mini-game to the user.

6. The method of claim 1, wherein the computer non-story game is selected from the list consisting of slot games, bingo game, card game, lottery game, casual games, puzzle games, board games, adventure games, action games and match three games.

7. The method of claim 1, wherein the association of the challenge and the at least one choice changes between repetitions of the computer story game.

8. The method of claim 1, comprising presenting the challenge to the user after obtaining the selection of the at least one choice associated with challenge.

9. A method for providing a combined computer game, the method comprising:
providing, by a processor, a computer non-story game, wherein the non-story game comprises a first type of winnable game assets that are provided to a player based on the player achievements in the non-story game; and
providing, by the processor, a computer story game, wherein the computer story game comprises a story with a plurality of consecutive segments, each segment comprising a nodes and a plurality of branches originating from the node and leading to other nodes, wherein each node is associated with a unique narrative,
wherein progressing in the computer story game comprises:
presenting, by the processor, a subset of branches originating from a single node to the player, wherein at least one branch of the subset of branches is associated with an amount of the first type of winnable game assets;
receiving, at the processor, selection of a branch of the subset of branches from the player;
progressing, by the processor, to the branch selected by the player, wherein progressing to the branch associated with the amount of the first type of winnable game assets comprises receiving, by the processor, the amount of the first type of winnable game assets from the player; and
presenting, on a display, the narrative of the node associated with the selected branch to the player.

10. The method of claim 9, wherein playing the computer non-story game requires receiving, by the processor from the player, a second type of winnable game assets, wherein selecting the at least one branch of the subset of branches that is associated with an amount of the winnable game assets provides an amount of the second type of winnable game assets to the player.

11. The method of claim 9, wherein the computer non-story game is selected from the list consisting of slot games, bingo game, card game, lottery game, casual games, puzzle games, board games, adventure games, action games and match three games.

12. The method of claim 9, wherein at least one branch of the subset of branches is associated with a mini-game reward, wherein selecting, by the processor, the branch associated with the mini-game reward comprises providing, by the processor a mini-game to the player.

13. The method of claim 12, wherein the mini-game comprises the first type of winnable game assets that are provided to a player based on the player achievements in the mini-game.

14. A system for providing a dynamic obstacle in a computer game, the system comprising:
a memory;
a computer output device;
a processor configured to:
provide a computer non-story game; and
provide a computer story game, wherein the computer story game is represented as a directed graph wherein nodes of the directed graph represent pages, and edges of the directed graph represent choices,
wherein the processor is configured to progress in the computer story game by:
presenting a subset of choices originating from a single page to a user on the computer output device, wherein at least one choice of the subset of choices is associated with a challenge achievable at the computer non-story game;
receiving a selection of a choice of the subset of choices from the user;
progressing to a next page according to the selection of the user, wherein the processor is configured to stall the computer story game until the user completes the challenge at the computer non-story game if the selected choice is associated with a challenge; and
presenting the selected page to the user on the computer output device.

15. The system of claim 14, wherein the processor is configured to:
specify an amount of the winnable game assets that are required to complete the challenge;
provide the winnable game assets to a player in the non-story computer game, wherein the winnable game assets are provided to the player based on achievements of the player in the non-story computer game; and
obtain from the user the specified amount of the winnable game assets to complete the challenge.

16. The system of claim 14, wherein at least one choice of the subset of choices is associated with providing a reward to the user.

17. The system of claim 14, wherein the processor is configured to obtain game assets from the user to enable playing the computer non-story game, wherein the reward comprises an amount of the game assets.

18. The system of claim 14, wherein at least one choice of the subset of choices is associated with a mini-game, wherein the processor is configured to provide a mini-game to the user if the choice associated with the mini-game is selected.

19. The system of claim 14, wherein the computer non-story game is selected from the list consisting of slot games, bingo game, card game, lottery game, casual games, puzzle games, board games, adventure games, action games and match three games.

20. The system of claim 14, wherein the processor is configured to change the association of the challenge and the at least one choice between repetitions of the computer story game.

* * * * *